United States Patent

[11] 3,624,415

[72] Inventors Carl E. Atkins
Montclair, N.J.;
Arthur F. Cake, Smithstown, Long Island, N.Y.
[21] Appl. No. 38,960
[22] Filed May 20, 1970
[45] Patented Nov. 30, 1971
[73] Assignee Wagner Electric Corporation

[54] RESISTANCE-RESPONSIVE CONTROL CIRCUIT
9 Claims, 3 Drawing Figs.

[52] U.S. Cl. .......... 307/264, 307/236, 307/261, 328/26, 328/157, 328/173
[51] Int. Cl. .......... H03k 5/13, H03k 5/156, H03k 5/20
[50] Field of Search .......... 307/236, 260, 261, 262, 264; 328/26, 31, 157, 173

[56] References Cited

UNITED STATES PATENTS

| | | | |
|---|---|---|---|
| 2,822,474 | 2/1958 | Boecker .......... | 328/26 |
| 3,482,116 | 12/1969 | James .......... | 307/236 X |
| 2,794,123 | 5/1957 | Younker .......... | 328/58 |

OTHER REFERENCES

Marsocci, " A Survey of Semiconductor Devices and Circuits in Computers," Semiconductor Products (publication), Vol. 4, No. 1, p. 31, 1/1961

*Primary Examiner*—Donald D. Forrer
*Assistant Examiner*—L. N. Anagnos
*Attorney*—Eyre, Mann & Lucas

ABSTRACT: A pulse-generating circuit produces pulses of alternating polarity which are applied to two sets of potentiometers in two separate signal channels, one channel being positive-pulse responsive and the other negative-pulse responsive. When a resistive keying network is connected to the common inputs of the two channels, to the pulse-generating circuit and to ground, the pulse outputs of the two channels combine to maintain a transistor continuously conductive, thereby changing the energization state of a load. Each channel performs a discrimination function for individual components of the keying circuit, and will not generate the necessary output if the values of such components are not within a predetermined range.

PATENTED NOV 30 1971

3,624,415

INVENTORS
CARL E. ATKINS
ARTHUR F. CAKE
BY
Eyre, Mann & Lucas
ATTORNEYS

RESISTANCE-RESPONSIVE CONTROL CIRCUIT

The present invention relates to resistance-responsive control circuitry for controlling the energization state of a load. Specifically, a portion of the present circuit generates a series of substantially rectangular pulses of alternating polarity, which are applied to a resistive keying circuit and to two sets of potentiometers in separate positive-polarity and negative-polarity sensing and signal generating channels. With a keying circuit having the proper component values is connected between the three keying terminals, the two sensing and signal generating circuits will each provide an output comprising a series of positive pulses having a substantially rectangular waveform, one series being 180° out of phase with the other. When combined, the outputs of the two channels result in a substantially constant DC current of a magnitude equal to the peak value of the component pulses. This DC current is fed to the input of a transistor, thus enabling flow of a constant current in the output of that transistor and energizing the winding of a relay. The output of one channel without the added output of the other channel will not maintain the relay constantly open or closed.

A better understanding of the present invention may be had by reference to the accompanying drawings, of which:

Figure 1:
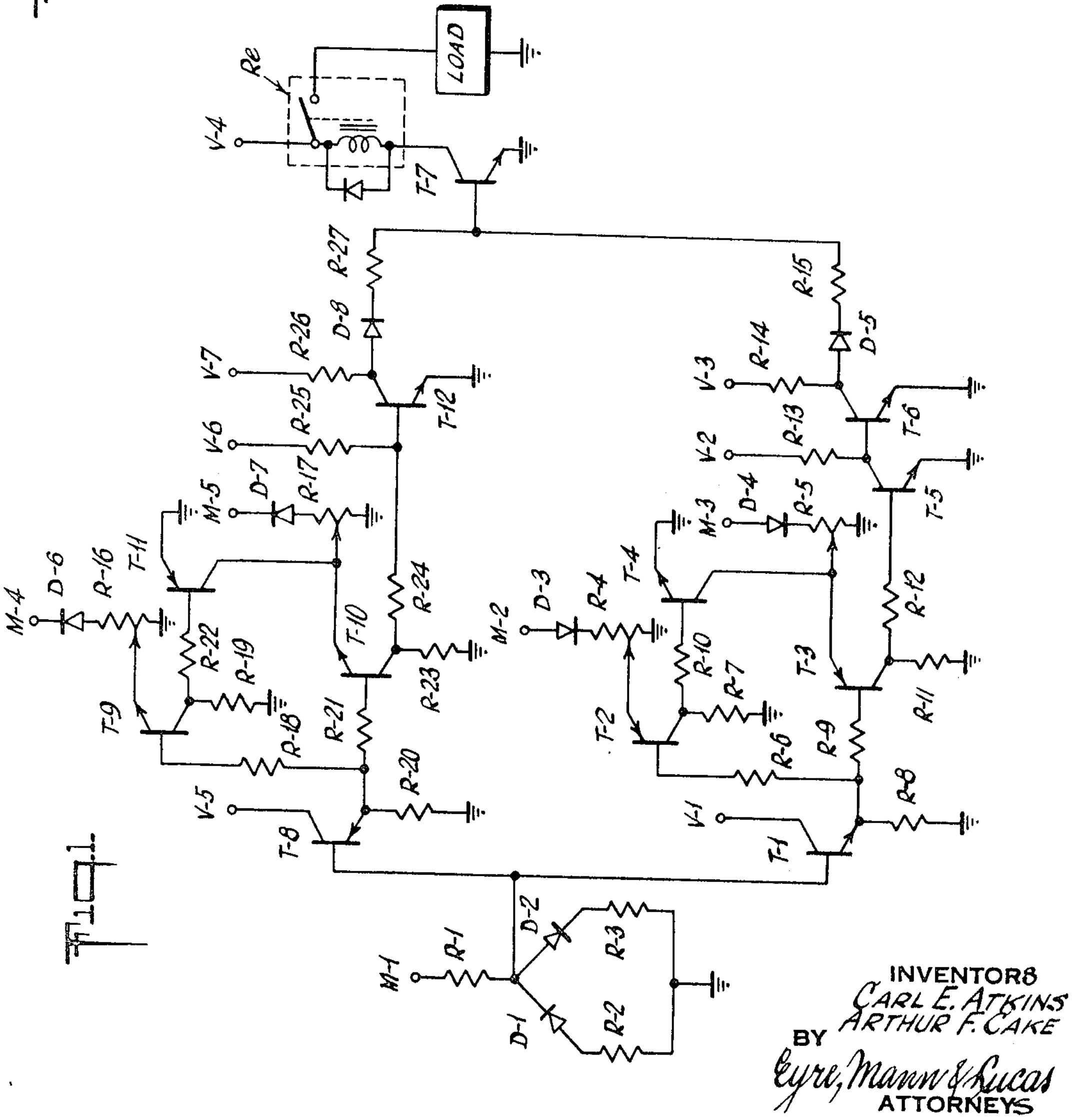
FIG. 1 is a schematic wiring diagram of the resistive keying network, the positive-polarity and negative-polarity sensing and signal-generating circuits, and the load-controlling circuit, all in combination.

Referring specifically to FIG. 1, the three-terminal resistive keying network consists of common resistor R–1 connected from the terminal M–1 to the junction of the cathode of diode D–1 and anode of diode D–2, with branch resistor R–2 being connected between ground and the anode of diode D–1 and branch resistor R–3 being connected between ground and the cathode of diode D–2. The output of this keying network is derived at the aforementioned junction of diodes D–1 and D–2, and is applied to the input terminals of the two sensing and signal generating circuits. The voltage which is applied to the terminal M–1 is a series of pulses having a rectangular waveform and of alternating polarity (see FIG. 3*a*). Thus, in effect, a rectangular wave of positive polarity is provided to the circuit comprising common resistor R–1, diode D–2 and branch resistor R–3, and a rectangular wave of negative polarity is applied to the circuit comprising common resistor R–1, diode D–1 and branch resistor R–2. The output of the keying circuit has the same waveform as the voltage applied at the pulse terminal M–1, i.e., a rectangular wave of alternating polarity. Since the keying circuit is in effect a voltage divider for the positive and negative portions of the voltage wave applied at terminal M–1, both portions of the output are reduced in peak value. The positive portion of the output of the keying circuit may be viewed as being provided only to the positive-polarity sensing and signal-generating circuit, since it will have no effect on the output of the parallel negative-polarity sensing and signal-generating circuit. Similarly, the negative portion of the output of the keying circuit may be viewed as being provided only to the negative-polarity sensing and signal generating circuit.

Looking now at the first or positive-polarity sensing and signal generating circuit, and viewing the effective input signal thereto as being a series of positive-rectangular pulses which are 180° out of phase with the series of negative rectangular pulses which is the effective input signal to the parallel negative-polarity sensing and signal generating circuit, these positive input pulses are generated by the passage of current through resistor R–1, diode D–2 and resistor R–3 to ground during the positive portion of the alternating-polarity rectangular wave which is simultaneously applied to terminals M–1, M–2, M–3, and in the parallel circuit, M–4 and M–5. A diode D–3 and a potentiometer R–4 are connected in series between terminal M–2 and ground, and a diode D–4 and a potentiometer R–5 are connected in series between terminal M–3 and ground. Diodes D–3 and D–4 are so oriented that only the positive portion of the voltage wave at terminals M–2 and M–3 will generate a current through potentiometers R–4 and R–5. The wiper of potentiometer R–4 is set to pick off a slightly smaller positive voltage than that which is picked off by the wiper of potentiometer R–5. The wiper of potentiometer R–4 is connected to the emitter of transistor T–2, the base of which is connected through resistor R–6 to the emitter of transistor T–1, and the collector of which is connected through resistor R–7 to ground. The emitter of transistor T–1 is connected to ground through resistor R–8 and to the base of transistor T–3 through resistor R–9. The collector of transistor T–1 is connected to the power source (+12 volts DC) at terminal V–1. The emitter of transistor T–3 is connected to the wiper of potentiometer R–5 and to the collector of transistor T–4. The base of transistor T–4 is connected through resistor R–10 to the collector of transistor T–2, and the emitter of transistor T–4 is connected directly to ground. The collector of transistor T–3 is connected through resistor R–11 to ground, and is connected through resistor R–12 to the base of transistor T–5. Transistors T–5 and T–6 and their respective load resistances R–13 and R—14 form a two-stage amplifier, the output of which is derived at the junction of the collector of transistor T–6 and resistor R–14. The load resistors R–13 and R–14 are connected to the power source (+12 volts DC) at terminals V–2 and V–3, respectively. The output, which is a series of positive pulses (FIG. 3*b*) when the proper values of resistors R–1 and R–3 are utilized in the keying network, is provided through diode D–5 and resistor R–15 to the base of the load-controlling transistor T–7. In the preferred embodiment disclosed herein, the coil of a rely Re is connected in the controlled-current path of transistor T–7, i.e., in series between the source of DC power applied at terminal V–4 and the collector of transistor T–7, the emitter of which is connected to ground.

In operation, a series of positive rectangular pulses is provided to the base of transistor T–1 by the energized keying network. Simultaneously, the positive portion of the alternating-polarity rectangular wave which is applied to the keying network is also applied to the terminals M–2 and M–3, thus generating positive pulses at the wipers of potentiometers R–4 and R–5. If the values of resistors R–1 and R–3 in the keying circuit are within the predetermined ranges, the positive output at the emitter of transistor T–1 will be such that the output at the collector of transistor T–2 will not be sufficient to turn on transistor T–4 and thus connect the emitter of transistor T–3 to ground. However, under these conditions, the output at the emitter of transistor T–1 will be sufficient to cause a positive pulse output at the collector of transistor T–3 of sufficient magnitude to render transistor T–7 conductive after amplification by transistors T–5 and T–6. If the values of resistors R–1 and R–3 in the keying circuit are such that a series of too-large positive pulses are applied to the base of transistor T–1, the positive pulses at the emitter of transistor T–1 will also be too large and neither T–2 nor T–3 will be turned on. Therefore, no output will appear at the collector of transistor T–3. On the other hand, if the values of resistors R–1 and R–3 are such that the input to the base of transistor T–1 is a series of too-small positive pulses, then the pulses appearing at the emitter of transistor T–1 will also be too small and, although they will enable transistor T–3 to become conductive, they will also allow transistor T–2 to become conductive, thereby providing an input to the base of transistor T–4 which will render transistor T–4 conductive and connect the emitter of transistor T–3 to ground. Consequently, the current generated by the voltage on the wiper of potentiometer R–17 will be shunted from the emitter of transistor T–3 to ground, and no output will be generated at the collector of transistor T–3.

Looking now at the second or negative-polarity sensing and signal generating circuit, the effective input signal to which is a series of negative rectangular pulses which are 180° out of phase with the series of positive rectangular pulses comprising the effective input signal to the parallel positive-polarity sensing and signal generating circuit, these negative input pulses are generated by the passage of current from ground through resistor R–2, diode D–1 and resistor R–1 of the keying network during the negative portion of the alternating-polarity rectangular wave which is simultaneously applied to terminals M–1, M–4, M–5 and in the parallel circuit, M–2 and M–3. A diode D–6 and a potentiometer R–16 are connected in series between terminal M–4 and ground, and a diode D–7 and a potentiometer R–17 are connected in series between terminal M–5 and ground. Diodes D–6 and D–7 are so oriented that only the negative portion of the voltage wave at terminals M–4 and M–5 will generate a current through potentiometers R–16 and R–17. The wiper of potentiometer R–16 is set to pick off a slightly smaller negative voltage than that which is picked off by the potentiometer R–17. The wiper of potentiometer R–16 is connected to the emitter of transistor T–9, the base of which is connected through resistor R–18 to the emitter of transistor T–8, and the collector of which is connected through resistor R–19 to ground. The emitter of transistor T–8 is connected to ground through resistor R–20 and to the base of transistor T–10 through resistor R–21. The collector of transistor T–8 is connected to the power source (−12 volts DC) at terminal V–5. The emitter of transistor T–10 is connected to the wiper of potentiometer R–17 and to the collector of transistor T–11, the base of transistor T–11 is connected through resistor R–22 to the collector of transistor T–9, and the emitter of transistor T–11 is connected directly to ground. The collector of transistor T–10 is connected through resistor R–23 to ground, and is connected through resistor R–14 to the base of transistor T–12, which is also connected through resistor R–25 to the power source (+12 volts DC) at terminal V–6. Similarly, the collector of transistor T–12 is connected through resistor R–26 to the power source (+12 volts DC) at terminal V–7, and the emitter is connected directly to ground. The output is derived at the junction of the collector of transistor T–12 and resistor R–26, and comprises a series of positive pulses (FIG. 3*c*) when the proper values of resistors R–1 and R–2 are utilized in the keying network. These output pulses are provided through diode D–8 and resistor R–27 to the base of load controlling transistor T–7 where they are added to the output of the parallel positive-polarity sensing and signal generating circuit. These two sets of positive output pulses combine to provide a substantially steady DC input current (FIG. 3*d*) to the base of transistor T–7.

In operation, a series of negative rectangular pulses is provided to the base of transistor T–8 by the energizing keying circuit. Simultaneously, the negative portion of the alternating-polarity rectangular wave which is applied to the keying circuit is also applied to the terminals M–4 and M–5, thus generating negative pulses at the wipers of potentiometers R–16 and R–17. If the values of resistors R–1 and R–2 in the keying circuit are within the predetermined ranges, the negative output at the emitter of transistor T–8 will be such that the output at the collector of transistor T–9 will not be sufficient to turn on the transistor T–11 and thus connect the emitter of transistor T–10 to ground. However, the output at the emitter of transistor T–8 will be sufficient to cause a negative pulse output at the collector of transistor T–10 of sufficient magnitude to render transistor T–12 nonconductive. Thus, a positive pulse will appear at the collector of transistor T–12 and will be transmitted via diode D–8 and resistor R–27 to the base of transistor T– 7 to render same conductive for the duration of the pulse. If the values of R–1 and R–2 in the keying network are such that a series of too-large negative pulses are applied to the base of transistor T–8, the negative pulses appearing at the emitter of transistor T–8 will also be too large and neither T–9 nor T–10 will be turned on. Thus, the output appearing at the collector of transistor T–10 will be insufficient to render transistor T–12 conductive. On the other hand, if the values of resistors R–1 and R–2 are such that the input to the base of transistor T–8 is a series of too-small negative pulses, then the negative pulses appearing at the emitter of transistor T–8 will also be too small, and although they will enable transistor T–10 to become conductive, they will also allow transistor T–9 to become conductive, thereby providing an input to the base of transistor T–11 which will render transistor T–11 conductive and connect the emitter of transistor T–10 to ground. Consequently, the current generated by the voltage on the wiper of potentiometer R–17 will be shunted from the emitter of transistor T–10 to ground, and no output will be generated at the collector of transistor T–10.

Figure 2:
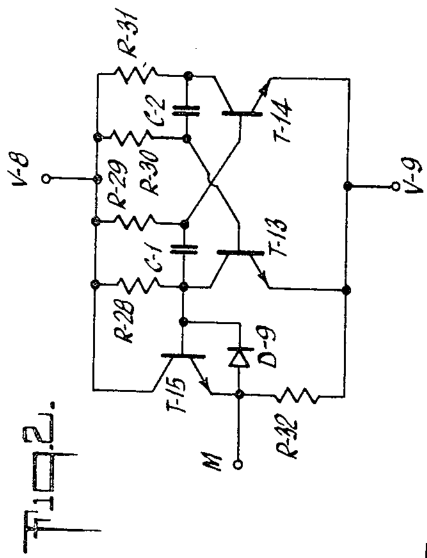
FIG. 2 is a schematic wiring diagram of the pulse-generating circuit.

Referring now specifically to FIG. 2, there is schematically shown the preferred circuit for generating a series of rectangular pulses of alternating polarity. This circuit comprises an astable multivibrator connected between terminals V–8 and V–9, to which +12 volts DC and −12 volts DC are applied, respectively. The multivibrator circuit comprises transistors T–13, and T–14, the emitter of each of which is connected to terminal V–9. The base of transistor T–14 is connected to the collector of transistor T–13 through capacitor C–1, and the base of transistor T–13 is connected to the collector of transistor T–14 through capacitor C–2. Resistances R–28 and R–29 are connected in series across capacitor C–1, with their junction connected to terminal V–8. Similarly, resistors R–30 and R–31 are connected in series across capacitor C–2, with their junction also being connected to terminal V–8. The base of transistor T–15 is connected to the collector of transistor T–13. The collector of transistor T–15 is connected to terminal V–8, and the emitter is connected through resistor R–32 to terminal V–9. A diode D–9 has its anode connected to the emitter of transistor T–15 and its cathode connected to the base of that transistor. The output of this circuit is derived at terminal M, which is connected to the emitter of transistor T–15.

Figure 3:
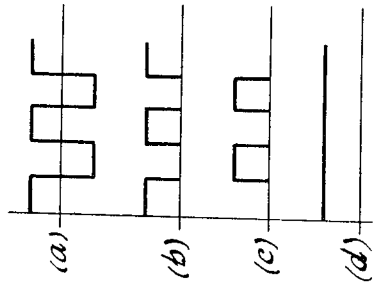
FIG. 3 illustrates on a common time base the various waveforms appearing at different points in the circuit during operation.

FIG. 3(*a*) illustrates the output waveform at the terminal M of the circuit shown in FIG. 2. FIGS. 3(*b*) and (*c*) illustrate the output waveforms generated by the positive-polarity and negative-polarity sensing and signal generating circuits, respectively, in response to the connection of the keying network, and showing their phase relationship with one another and with the output of the circuit shown in FIG. 2. FIG. 3(*d*) illustrates the DC voltage appearing at the base of transistor T–7, which is the sum of (*b*) and (*c*).

The values of the various elements of the preferred embodiment of the invention disclosed herein are as follows:

| Resistances | |
|---|---|
| R–1 | 5 kΩ |
| R–2 | 5 kΩ |
| R–3 | 5 kΩ |
| R–4 | 1 kΩ |
| R–5 | 1 kΩ |
| R–6 | 100 kΩ |
| R–7 | 100 kΩ |
| R–8 | 1 kΩ |
| R–9 | 100 kΩ |
| R–10 | 10 kΩ |
| R–11 | 100 kΩ |
| R–12 | 50 kΩ |
| R–13 | 10 kΩ |
| R–14 | 1 kΩ |
| R–15 | 10 kΩ |
| R–16 | 1 kΩ |
| R–17 | 1 kΩ |
| R–18 | 100 kΩ |
| R–19 | 100 kΩ |
| R–20 | 1 kΩ |
| R–21 | 100 kΩ |
| R–22 | 10 kΩ |
| R–23 | 100 kΩ |
| R–24 | 10 kΩ |
| R–25 | 22 kΩ |
| R–26 | 1 kΩ |
| R–27 | 10 kΩ |
| R–28 | 1 kΩ |
| R–29 | 10 kΩ |
| R–30 | 10 kΩ |
| R–31 | 1 kΩ |
| R–32 | 10 kΩ |

| Capacitors | |
|---|---|
| C–1 | 0.1 microfarads |
| C–2 | 0.1 microfarads |

| PNP-Transistors | |
|---|---|
| T–2 | 2N4248 |
| T–3 | 2N4248 |
| T–8 | 2N4248 |
| T–11 | 2N4248 |

| NPN-Transistors | |
|---|---|
| T–1 | 2N5135 |
| T–4 | 2N5135 |
| T–5 | 2N5135 |
| T–6 | 2N5135 |
| T–7 | 2N5135 |
| T–9 | 2N5135 |
| T–10 | 2N5135 |
| T–12 | 2N5135 |
| T–13 | 2N5135 |
| T–14 | 2N5135 |
| T–15 | 2N5135 |

Numerous operational advantages are derived from the preferred embodiment of the present invention disclosed herein by simultaneously applying a series of rectangular pulses of alternating polarity to terminals M–2 and M–3 in the positive polarity sensing and signal generating circuit and to terminals M–4 and M–5 in the negative-polarity sensing and signal generating circuit, rather than by applying steady DC power to those terminals. Power is conserved, and compensation is made for any fluctuations in the magnitude of the pulses appearing at terminal M of the multivibrator circuit which result from drift in component parameters. Also, the embodiment disclosed herein is, as a practical matter, tamperproof, in that a would-be thief would have no inkling of the type of three-terminal keying network to which the circuit is designed to respond. Even if a thief knew the schematic wiring diagram of the keying network, the various permutations and combinations of resistances R–1, R–2 and R–3 that would have to be tried would effectively deter a thief from even attempting to determine these values by trial and error. Even if such an attempt were made, network component values must all be simultaneously correct. If the values of R–1 and R–3 were correctly selected, but the values of R–2 is incorrect, only the positive-polarity sensing and signal generating circuit will generate an output of positive pulses, and this output alone is not sufficient to energize the relay in the load controlling circuit. Similarly, if the values of R–1 and R–2 were correctly selected, but the value of R–3 is incorrect, then the negative-polarity sensing and signal generating circuit will only produce an output of positive pulses, with the same result as before.

It will be readily appreciated that either the positive polarity or negative-polarity sensing and signal generating circuit alone comprises a control circuit when the same DC power that is applied to terminals V–1, V–2 and V–3 is also applied to terminals M–2 and M–3, and when the same DC power that is applied to terminals V–5, V–6 and V–7 is also applied to terminals M–4 and M–5. In this mode of operation, each circuit will generate a positive DC output so long as a constant input signal of proper polarity and falling within a predetermined range of magnitudes is applied to the base of transistor T–1 or transistor T–8. Such an input signal could, of course, be supplied by a voltage divider network having a first or keying resistor connectable between the power source and the base of transistor T–1 or T–8 and a second resistor fixedly connected between the base and ground.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

What is claimed is:

1. A resistance-responsive control circuit comprising:

1. first circuit means operative to generate a series of pulses of alternating polarity and substantially rectangular waveform;
2. parallel first and second sensing and signal-generating circuit means operative in response to a first input signal from a multibranch resistive keying means energized by said first circuit means and a second input signal from said first circuit means to generate, respectively, first and second outputs each comprising a series of pulses of a predetermined polarity and substantially rectangular waveform which are added to form a substantially steady direct current; and
3. load circuit control means operative to provide an output signal proportional to its input signal, and further operative in response to said added outputs of said first and second sensing and signal-generating circuits to change the energization state of a load.

2. The resistance-responsive control circuit of claim 1 wherein each of said first and second sensing and signal-generating circuit means is operative to generate, respectively, said first and second outputs only if the resistors in first and second circuits, respectively, within said multibranch-resistive keying means fall within predetermined range of magnitude.

3. The resistance-responsive control circuit according to claim 1 wherein said multibranch resistive keying means has input, output and ground terminals and comprises:

a. a first unidirectional current circuit for conducting current of a first polarity and comprising a common first resistor, a first diode, and a second resistor connected in series between said input and ground terminals; and
b. a second unidirectional current circuit for conducting current of a second polarity and comprising said common first resistor, a second diode, and a third resistor connected in series between said input and ground terminals, and wherein said output terminal is connected to the junction of said first and second diodes.

4. The resistance-responsive control circuit of claim 1 wherein each of said first and second sensing and signal-generating circuit means comprises:

1. first amplifier circuit means operative to amplify portions of said first input signal of a predetermined polarity;
2. first and second comparison circuit means operative to compare said amplified portions of said first input signal with, respectively, first and second fractions of the portions of said second input signal of said predetermined polarity; and
3. second amplifier circuit means operative to amplify the output of said second comparison circuit means.

5. The resistance-responsive control circuit of claim 4 wherein, in each of said first and second sensing and signal-generating circuit means, 1. said first comparison circuit means is operative in response to an amplified first input signal which is too low to disable said second comparison circuit means from generating an output, and
2. said second comparison circuit means is operative in response to an amplified first input signal which is too high to generate a substantially null output.

6. The resistance-responsive control circuit of claim 4 wherein the outputs of said second amplifier circuit means of said first and second sensing and signal-generating circuit means are provided to said load circuit control means through first and second unidirectional current circuit means each comprising a diode and a resistor connected in series.

7. The resistance-responsive control circuit according to claim 1 wherein said load circuit control means comprises a transistor.

8. The resistance-responsive control circuit according to claim 1 wherein said first circuit means comprises an astable multivibrator.

9. A sensing and signal-generating circuit comprising:

1. first amplification circuit means operative to amplify an input signal;
2. first and second comparison circuit means operative to compare said amplified input signal with, respectively, first and second fractions of the applied voltage said first comparison circuit means being operative in response to an amplified input signal which is too low to disable said second comparison circuit means from generating a non-null output, and said second comparison circuit means being operative in response to an amplified input signal which is too high to generate a substantially null output; and
3. second amplification circuit means operative to amplify the output of said second comparison circuit means whereby said sensing and signal-generating circuit is operative to generate an output signal only in response to a DC input signal which falls within a predetermined range of fractions of the applied DC voltage.

* * * * *